United States Patent [19]

Caron

[11] Patent Number: 5,398,624
[45] Date of Patent: Mar. 21, 1995

[54] TRANSPLANTING TOOL

[76] Inventor: Francois Caron, 242 Chemin Soucy, Lac Baker, N. B., E0L 1C0, Canada

[21] Appl. No.: 72,894

[22] Filed: Jun. 7, 1993

[51] Int. Cl.⁶ .................................................. A01B 45/02
[52] U.S. Cl. ...................................... 111/106; 172/22; 175/20
[58] Field of Search ..................... 172/21, 22; 111/106, 111/101, 92, 88; 171/53, 54, 62; 294/50.6, 50.7, 60; 175/20

[56] References Cited

U.S. PATENT DOCUMENTS

| | | | |
|---|---|---|---|
| 177,444 | 5/1876 | Widney | 111/101 |
| 565,745 | 8/1896 | Harris | 111/101 |
| 1,044,109 | 11/1912 | Weave | 111/101 |
| 1,198,930 | 9/1916 | Krentel | 294/60 |
| 1,658,963 | 2/1928 | Bergquist | 294/60 |
| 2,210,440 | 8/1940 | Avary | 172/22 |
| 2,439,524 | 4/1948 | Moore | 111/101 |
| 2,599,087 | 6/1952 | Benison | 111/101 |
| 3,506,296 | 4/1970 | Nelson | 111/101 |
| 4,282,684 | 8/1981 | McLellan | 111/101 |
| 4,790,392 | 12/1988 | Clements | 175/20 |

FOREIGN PATENT DOCUMENTS 2260680 4/1993 United Kingdom ............... 294/50.6

Primary Examiner—Randolph A. Reese
Assistant Examiner—Spencer Warnick

[57] ABSTRACT

A transplanting tool for the manual extraction and planting of seedlings. The transplanting tool comprises, a digging tube, a hollow plunger slidably contained within said digging tube, a stem and a transverse piece forming a handle, and a pair of foot bars extending from the outside surface of said digging tube, at substantially opposite direction from one another. The arrangement of the components therefrom, offers a clear line of sight at the center of the hollow plunger for placing the digging tube over a seedling without damaging the plant's foliage. The angle of the foot bars is adapted to prevent strain on the user's leg, thereby facilitating altering between digging and walking motion. The transplanting tool is therefore especially suitable for extracting seedlings from rough terrains.

12 Claims, 7 Drawing Sheets

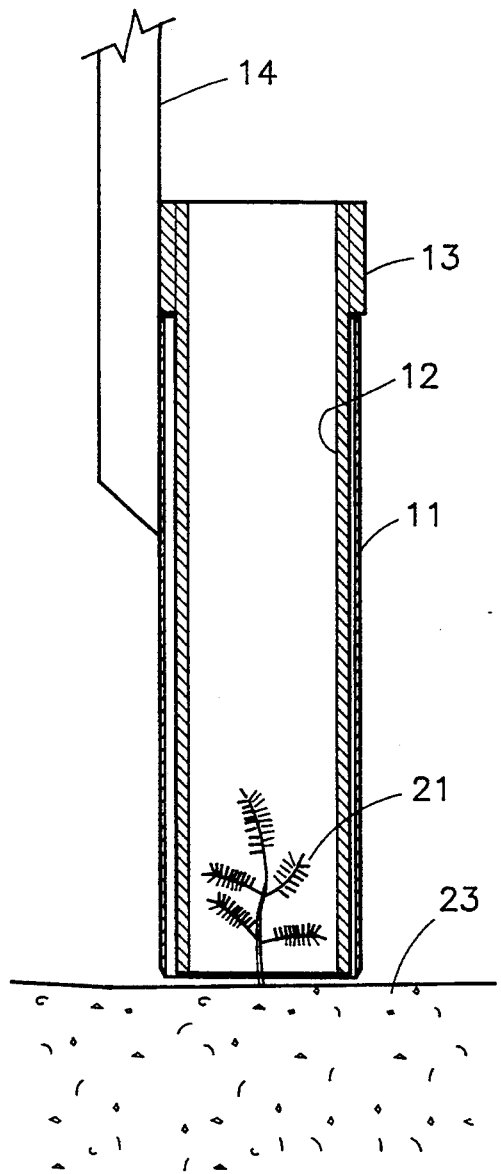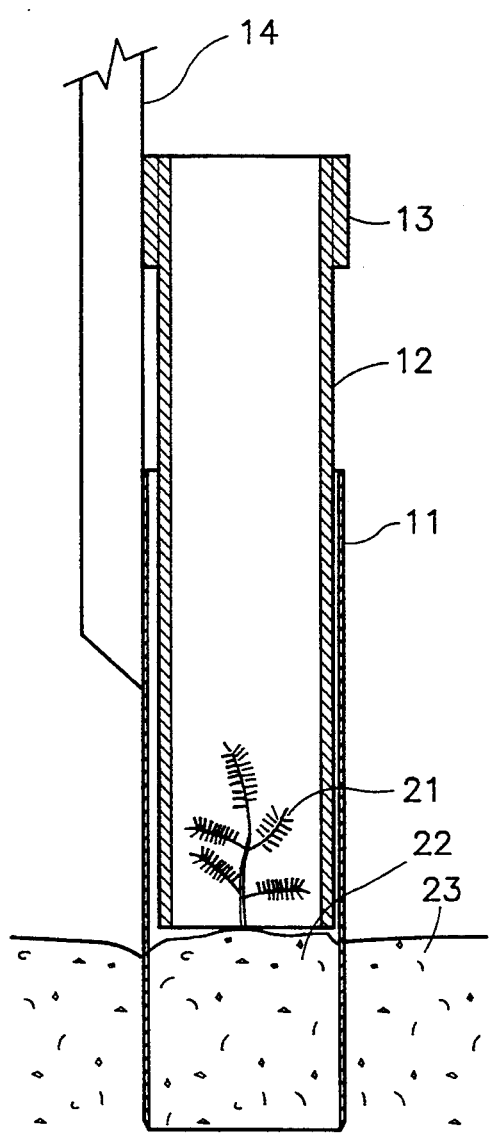
FIG. 5
FIG. 6

TRANSPLANTING TOOL

BACKGROUND OF THE INVENTION

The invention relates to manual implements to transplant young plants, and more specifically, the invention concerns manual implements to extract and to plant coniferous seedlings.

The reforestation of a land after logging is usually done by transplanting seedlings. There are several methods to start seedlings under controlled climatic conditions; One method is to germinate the seeds into individual pots which are thereafter transplanted into bedding fields. The seeds are sometimes started directly into bedding soil.

In many tree nurseries, the mature seedlings are extracted from the bedding area by workers using a small hand shovels. Individual trees and their root systems are carved out the soil and placed in boxes for transporting to the planting site.

Workers generally work in the kneeled down position, and great care is needed to manipulate the trees into the boxes.

Another common practice to extract seedlings from a bedding patch is to use a tubular tool which is placed over the plant, and pushed into the soil using both hands, and sometimes using both hands and a foot. A plug of soil containing the plant's root system is then pulled out of the soil. It is then manipulated out a tube which folds open, or pushed out of it mechanically.

The growing of plants in greenhouses and bedding fields is somewhat costly. Capital investment in buildings, land and equipment is substantial. The simulation of ideal forest environment using shaded covers, spraying trollies, and advanced fertilizers add to the expenses of maintaining a reforestation program.

Seedlings can be obtained at no costs in their natural states, in wooded areas next to the harvested lot. Well managed wooded lands are usually harvested in strips. One strip is clear cut and the strip adjacent to it remains untouched until the new transplants are high enough to take over in the preserving of the natural habitat for the basic vegetation, for birds and for game animals. Standing strips are also scarified regularly in order to assure maximum yield of the larger trees. These wooded strips contain quality seedlings in abundance which, if left there, will never become full grown trees anyway.

Another source of extraction for inexpensive seedlings is from undesirable growing sites such as borders of roads, fields and clearings.

The extraction of seedlings along roadsides and from wooded areas requires a tool which is light, which is not cumbersome, and which is efficient. Walking distances and obstructions between trees are enough burdens that workers don't want to waste time with laborious devices.

Most implements on the market are mechanically complex: the extraction processes consist of sequences of operations involving pedals and levers. It is also a common fact that extracting devices have handles or linkages which obstruct the line of sight of the tree at the center of the tubular digging part, Other tools have a conical tube, flared at the top, to facilitate the removal of the soil plug from the upper opening of the tube. The same tool is generally used to dig a hole to receive the seedling. If the new hole is not exactly at the same depth or deeper than the soil plug of the seedling, the upper roots of the new plant will remain exposed to air contact and therefore will dry and cause the plant to die. It is a common fact with these tools to observe a low survival rate of the plants, and especially in coarse soil where the appropriate digging depth is not always obtained at the first attempt.

Another common fact with tubular tools having foot bars, is that these bars form a straight angle with the digging tube. Therefore, the foot of the operator tends to slip sideways, and the knee tends to bow out of alignment. The torque produced therefrom on the tool requires much thrust on the handle to maintain alignment of the digging tube. The motion and force combined are pushing the operator out of balance at every drive of the tool.

SUMMARY OF THE INVENTION

It is an object of this invention to provide a transplanting tool which is suitable for use on roadsides and in wooded areas, by a person standing upright, reducing the amount of bending, kneeling, manipulating and strain usually associated with this activity.

It is also another object of this invention to provide a tool which is used for extracting as well as for planting young trees, without modification or adjustment to the tool itself.

It is also another object of this invention to provide a transplanting tool which offers a clear line of sight for placing over a seedling.

It is further another object of this invention to provide a transplanting tool which helps the operator to maintain his balance during the digging motion, facilitating altering between extracting or planting, and walking motions.

Other objects of this invention are to provide a transplanting tool which is simple of construction, efficient, durable, light in weight, inexpensive to manufacture, and easy to operate.

Accordingly, the transplanting tool comprises a hollow tube for penetrating the soil around a seedling to be transplanted, a hollow plunger sliding freely inside the hollow tube, for pushing a plug of soil out of the tube, a handle which is attached alongside the hollow tube, and a pair of foot bars attached to the side of the tube, for pressing the hollow tube into the ground.

The hollow tube is sharpened at its lower end. The sharpening is done on the outside of the tube, tapering to a sharp edge, and forming the digging portion of the tube. The wall of the tube is relatively thin, to facilitate the penetration of the soil. The angle of sharpening prevents the compaction of the soil inside the tube. Although the friction of the soil against the inside surface of the tube is sufficient to extract a seedling, the removal of the plug of soil from inside the hollow tube is also relatively easy.

The hollow plunger is slidably contained within the hollow tube. The upper end of the plunger has a shoulder which has a diameter larger than the hollow tube, thereby preventing the plunger from sliding out through the hollow tube, when placing the tool in the operating position.

The wall of the plunger is relatively thin, leaving maximum sighting opening at the center of the tool, to facilitate the placing of the tool over the plant without damaging the branches.

The length of the plunger below the shoulder is equal to the length of the hollow tube, thereby ensuring positive engagement of the plunger within the tube even when the hollow tube is pushed in the ground to maximum depth, and providing the means to eject a seedling completely from the digging tube. An optional chain may be provided to prevent disengagement and loss of the plunger when the tool is transported on the shoulder of the user.

The handle of the tool consists of a long stem having one end attached to the side of the hollow tube, and having a transverse piece centered on the other extremity. The transverse piece is substantially parallel to the foot bars. The attachment of the handle to the side of the tube ensures an unobstructed sighting of the plant through the center line of the tubular plunger.

The length of the transverse piece across the upper end of the handle is sufficient for holding and carrying the tool with one hand and for placing it over a plant. The force required to penetrate the soil is applied entirely on one of the foot bar, and thus, the handle being used for guiding only, excessive length of the transverse piece is not necessary. The second foot bar is merely to accommodate for right handed or left handed operators.

The location of the foot bars with respect to the lower end of the hollow tube determines the ideal digging depth for extracting and planting coniferous seedlings of 2-4 years old. This distance may vary on other models depending on species and age of plants being transplanted.

The diameter of the hollow tube is also ideal to collect enough soil around the root system so that the disturbance to the seedling, caused by the new site will be minimal.

The angle of the foot bars in relation to the axis longitudinal to the handle is somewhat smaller than a right angle. The reasons for this are; to prevent the foot from slipping sideways, and to maintain the sole at right angle with the person's leg, thereby keeping the ankle straight and thus keeping the operator in balance on his feet.

Another advantage of this disposition of the foot bars is that the pressure of the foot is always applied at a minimum distance from the tube. Therefore, the thrust force on the handle to overcome the torque produced by the push of the foot is minimum. The effective force to drive the tool in the ground resulting thereby is maximum.

Another advantage is that a person in balance requires less steps to reposition for walking after extraction or planting of a seedling, or to reposition a hole when the first drive stops on a rock. The innovative aspect therefrom causes less strain and fatigue on the worker than comparable extractors.

A preferred embodiment of the invention and the typical instructions to use it will now be described by way of examples, with reference to the accompanying drawings.

A BRIEF DESCRIPTION OF THE DRAWINGS

The accompanying drawings, which are incorporated in and form a part of the specification, illustrate the invention and, together with the detailed description, serve to explain the principles of the invention. In the drawings;

FIG. 5 is a cross section of the hollow tube and hollow plunger, along the line 5 of FIG. 2. The figure illustrates the tool before penetrating the soil around a seedling.

FIG. 6 illustrates a cross section of the tool, after penetrating the soil. The hollow tube contains the root system of the plant, and sufficient soil to preserve and maintain the roots until settling at the new location.

DETAILED DESCRIPTION OF THE INVENTION

Figures 1, 2:
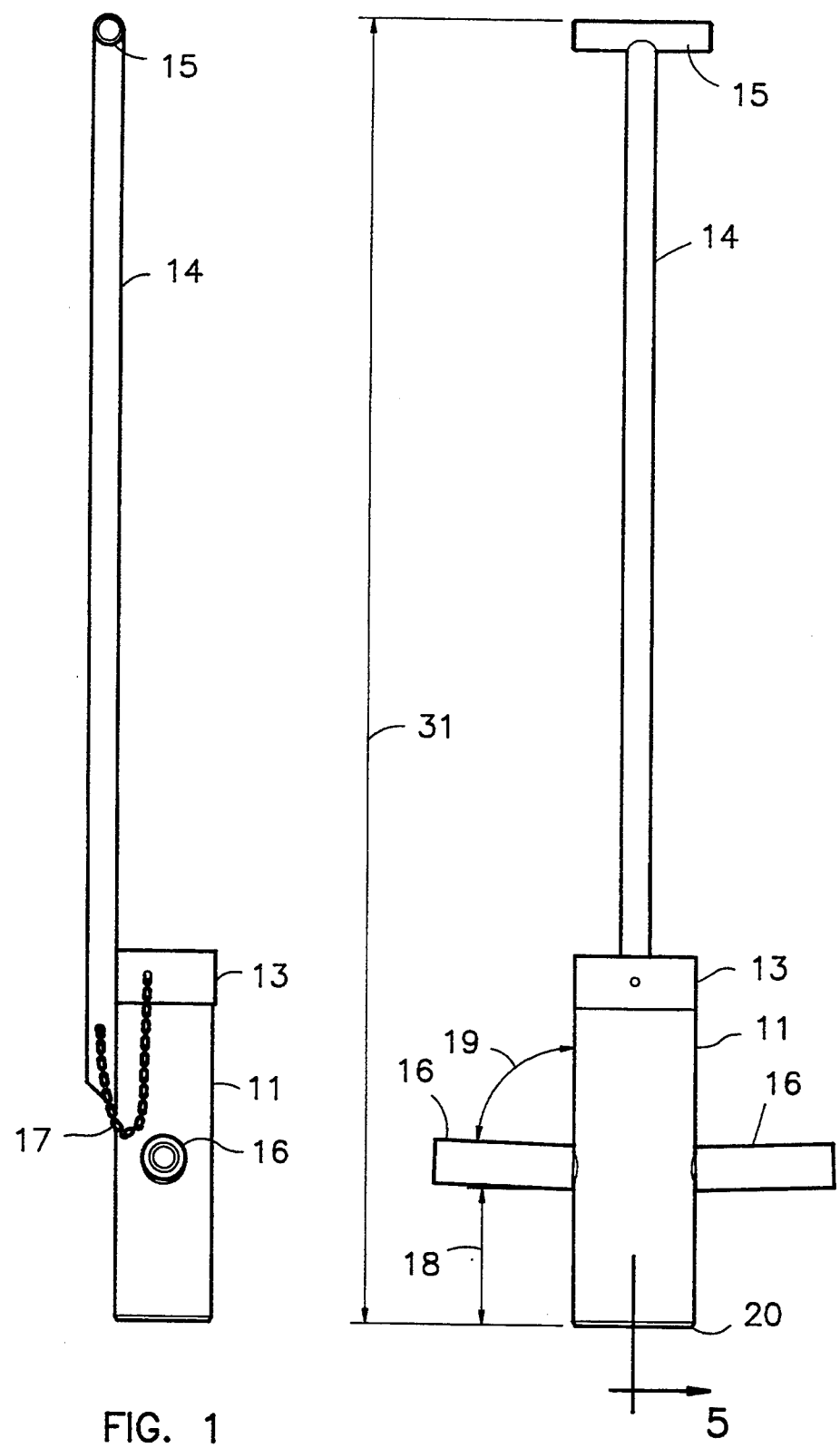
FIG. 1 is a side view of the tool. It shows the hollow plunger at its lowest position within the hollow tube.
FIG. 2 is a front view of the transplanting tool. The figure illustrates the configuration of the foot bars, and the relative length of the transverse handle.

Referring to FIGS. 1, 2, 3 and 4, the transplanting tool consists of; a hollow tube 11, a hollow plunger 12, a stem 14 and transverse piece 15 forming a handle and a pair of foot bars 16.

The hollow tube 11 has a sharpened end 20 at its lower extremity, to facilitate its penetration in the ground, and to prevent compacting the root system of the plant being extracted. The angle of sharpening is better illustrated on FIG. 4.

The hollow plunger 12 is slidably contained inside the hollow tube 11, and thereby is free to rest atop the soil when the hollow tube 11 penetrates the ground, as it is shown on FIG. 6.

Figures 3, 4:
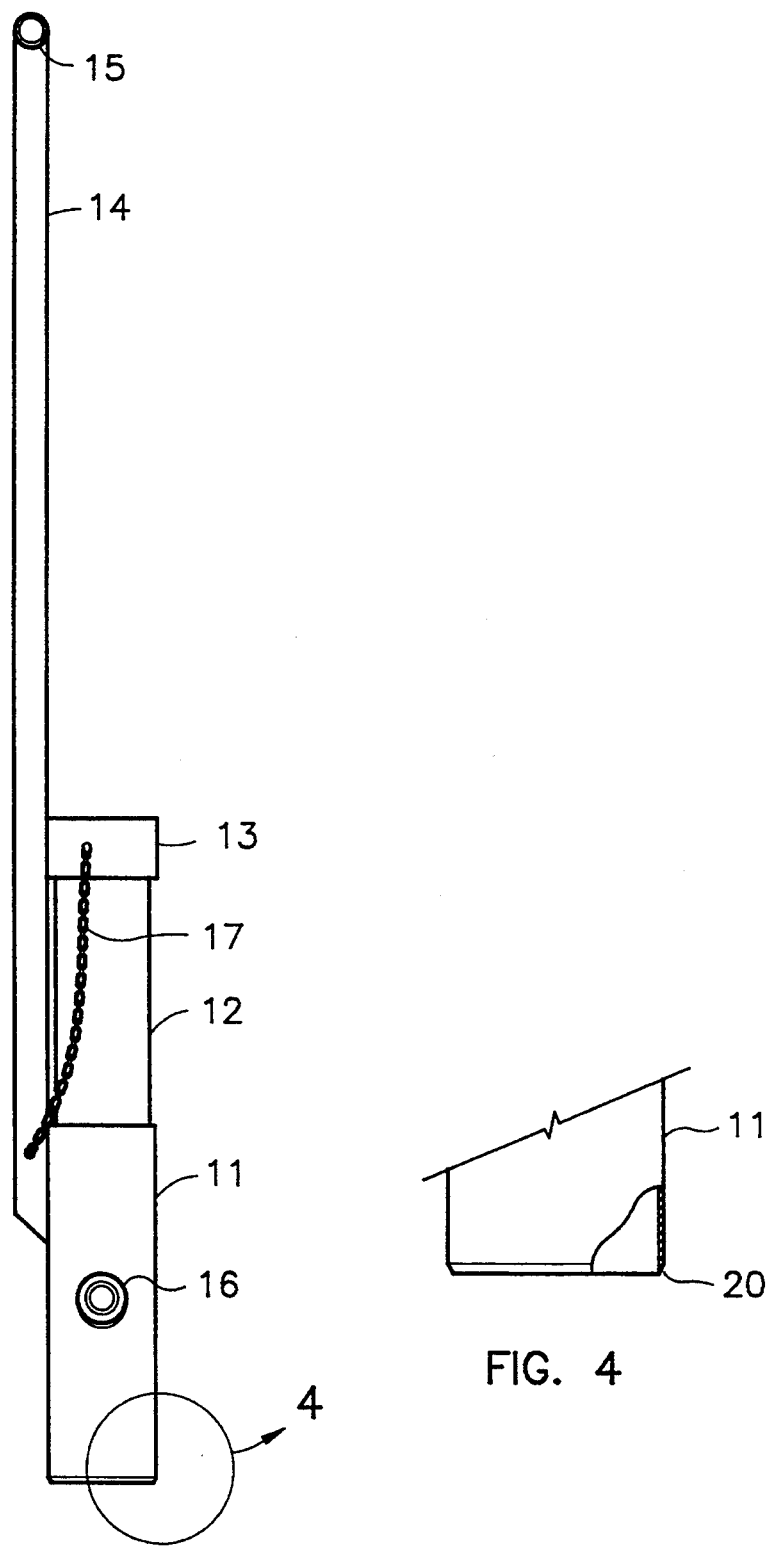
FIG. 3 is also a side view of the tool showing the hollow plunger at its upmost position when held by an optional safety chain.
FIG. 4 shows an enlarged view of detail no. 4 on FIG. 3. The figure illustrates the sharpened end of the hollow tube.

Referring back at FIGS. 2 and 3, the hollow plunger 12 has an enlarged portion 13 at its upper extremity, The enlarged portion 13 prevents the plunger 12 from slipping through the tube 11. An optional chain 17 prevents the hollow plunger 12 from sliding outside the hollow tube 11 when the tool is tilted upside down.

The length of the plunger 12 below the enlarged portion 13 is equal to the length of the hollow tube 11.

The pair of foot bars 16 are welded to the wall of the hollow tube 11. Each foot bar 16 is positioned at 180° from one another, and at a distance 18 from the sharpened end 20 which is equivalent to the ideal depth of digging for extracting a 2-4 years old coniferous seedling. The location of the foot bars 16, provides thereby a reference for repeatedly operating the device at ideal depth.

The angle 19 between the axis longitudinal to a foot bar 16, and the axis longitudinal to the hollow tube 11 is not a right angle. The reasons and advantages of this are explained later when making reference to FIG. 8.

The handle consists of a stem 14 extending upward and a transverse piece 15 at the upmost end of the stem 14. The length of the transverse piece 15 is sufficient to accommodate for one person's hand. The handle's stem 14 is welded to the hollow tube 11 at a location on the circumference of the tube, which is perpendicular to the plane defined by the attachment points of the foot bars 16.

The location of the stem 14, as described does not hinder the leg motion of the user, and it does not obstruct the line of sight of the operator, through the center of the hollow plunger 12.

A method for extracting a seedling 21 is explained on the FIGS. 5 and 6. The transplanting tool is placed over a young plant 21. The foliage of the plant 21 is completely enclosed within the hollow plunger 12. Then the hollow tube 11 is pushed into the ground by pressure of the user's foot, as illustrated on the FIG. 8. The hollow tube 11 is inserted into the soil until the foot bars 16 come to rest on the soil surface, making sure that the plug of soil 22 contained within the hollow tube 11 is large enough to suffice to the transplant of the seedling.

During the insertion motion, the hollow plunger 12 remains afloat on the surface of the soil 23, sliding upward in relation to, and within the hollow tube 11.

The transplanting tool is then pulled out of the soil, extracting by cohesion inside the hollow tube, the seedling 21, with sufficient soil for resettling at a new location.

Figure 9:
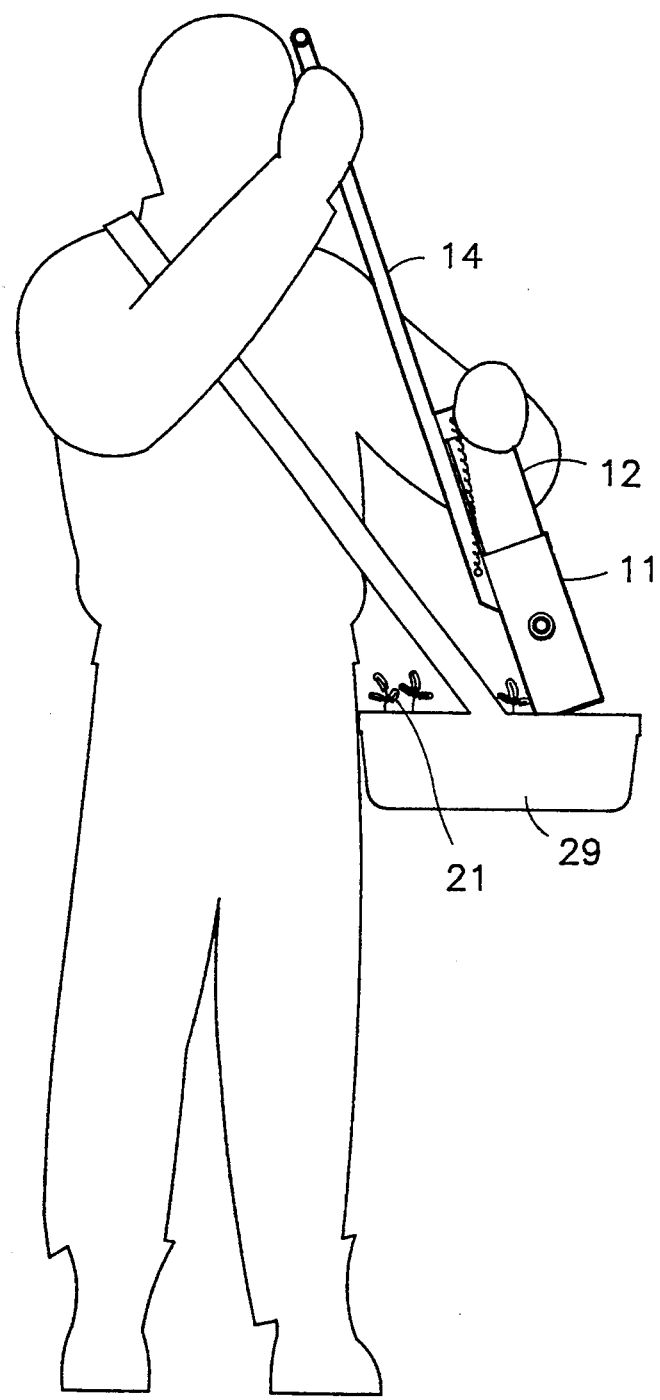
FIG. 9 illustrates a suggested method to push a seedling out of the tube and for carrying seedlings to a new site.

The tool is then brought over the top of a basket 29 worn at waist height by the user, as it is illustrated on the FIG. 9. The seedlings 21 is transposed into the basket 29 by manually pushing on the hollow plunger 12, forcing the plug of soil 22 to slide out of the hollow tube 11.

Figure 7:
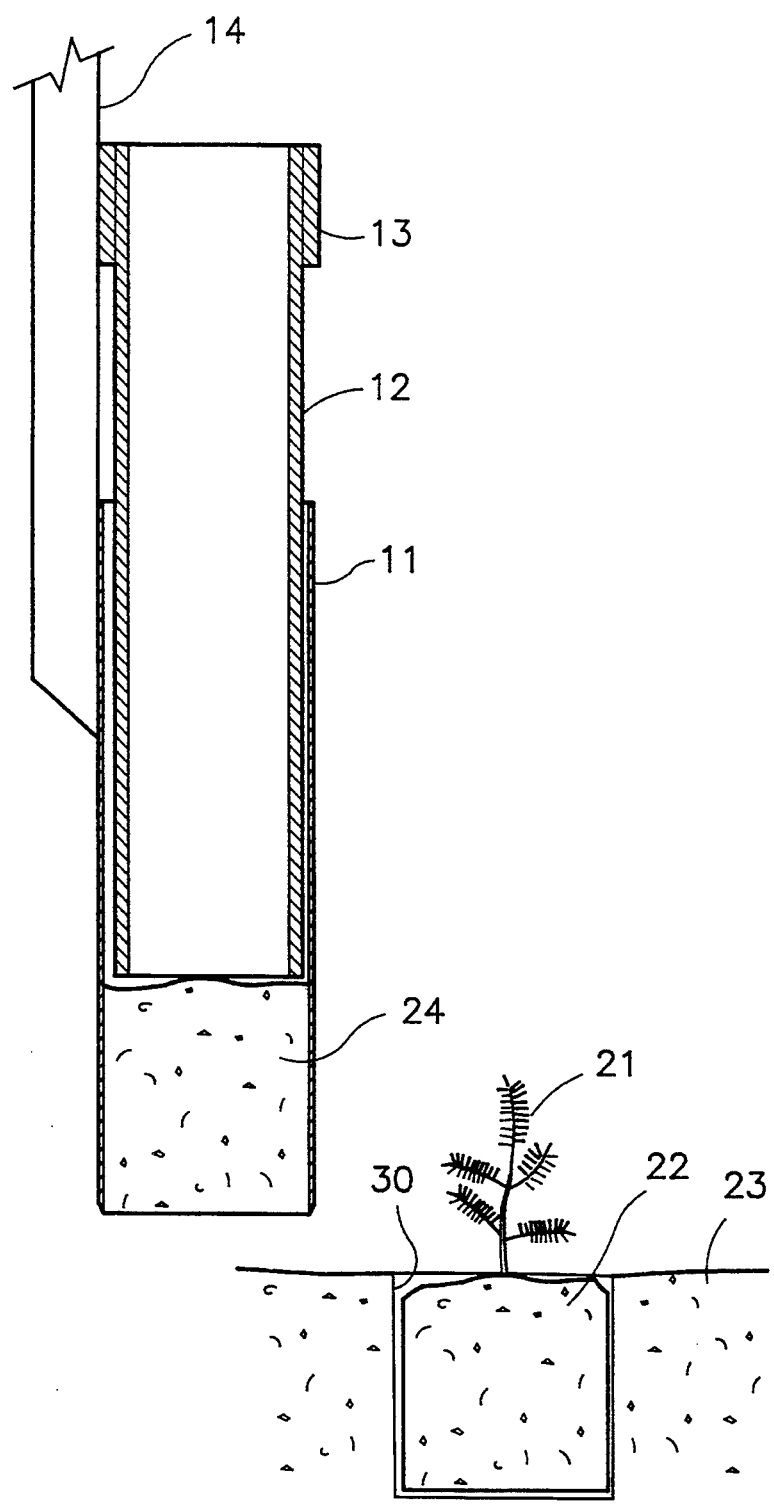
FIG. 7 is also a cross section of the tool showing the digging of a new hole for planting a seedling.
Figure 10:
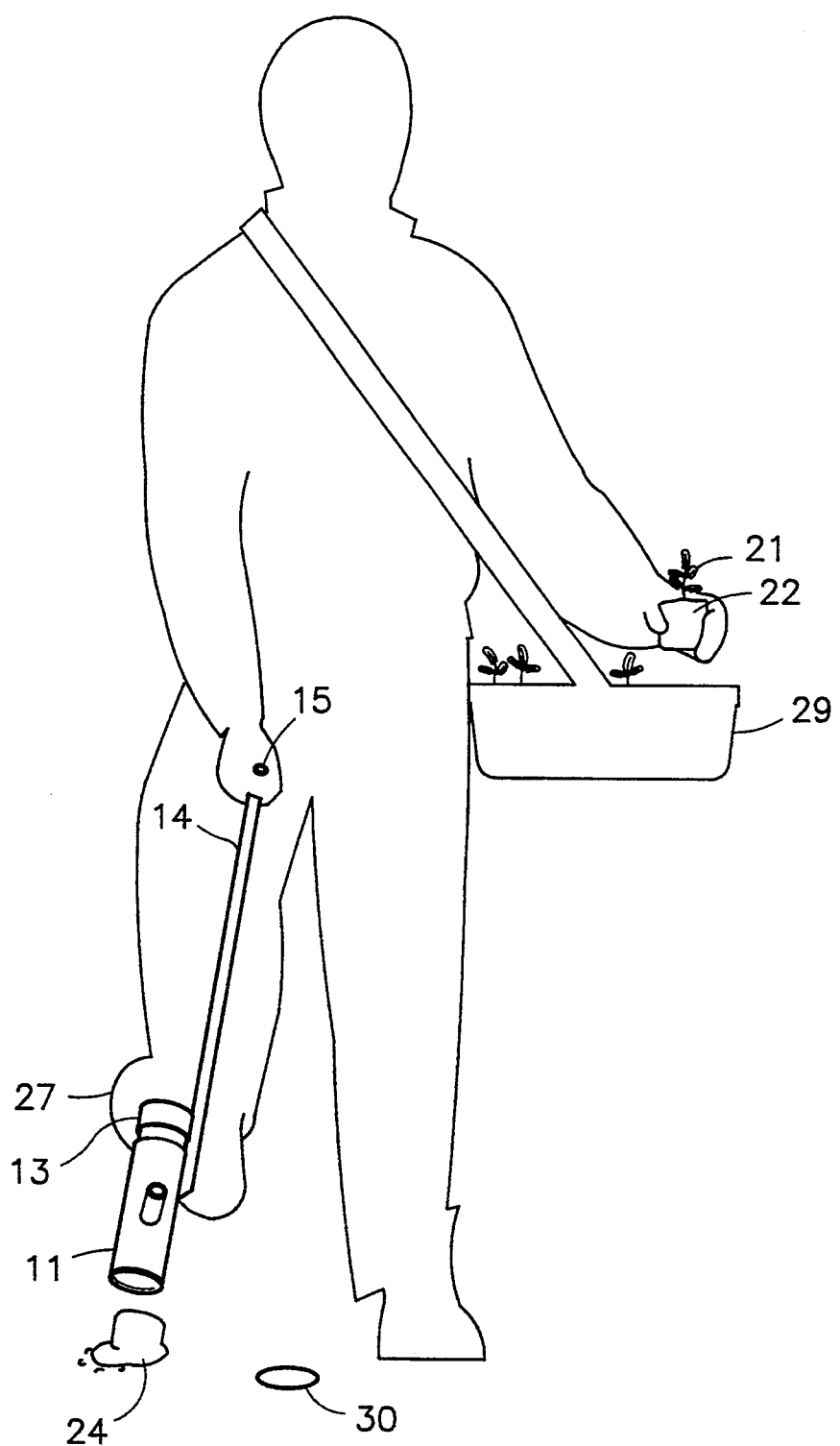
FIG. 10 illustrates a suggested method to push soil out of the hollow tube, after the digging of a new hole for planting a seedling.

A method for planting a seedling 21 is illustrated on FIGS. 7 and 10. The transplanting tool is used in the same way as during the extraction process, to dig a hole 30 having a precise depth and a diameter which will match the size of the plug of soil 22 of the seedling 21. The diameter of the hole 30 is normally enlarged slightly by swaying the handle 14, 15 sideways, and thereby to facilitate the placement of the new plant 21 inside the hole 30.

The plug of soil 24 removed from the hole 30 is pushed out of the hollow tube 11, by the pressure of the user's foot 27 on the boss 13 of the plunger 12, as illustrated on the FIG. 10, by hand as previously explained, or simply by shaking it loose against the ground during the walking to the next transplant.

The transplanting tool can also be used without a hollow plunger 12 during the planting process. In this case, the plug of soil 24 is extracted, from the hollow tube 11, by shaking it loose against the ground.

Referring back to

Figure 8:
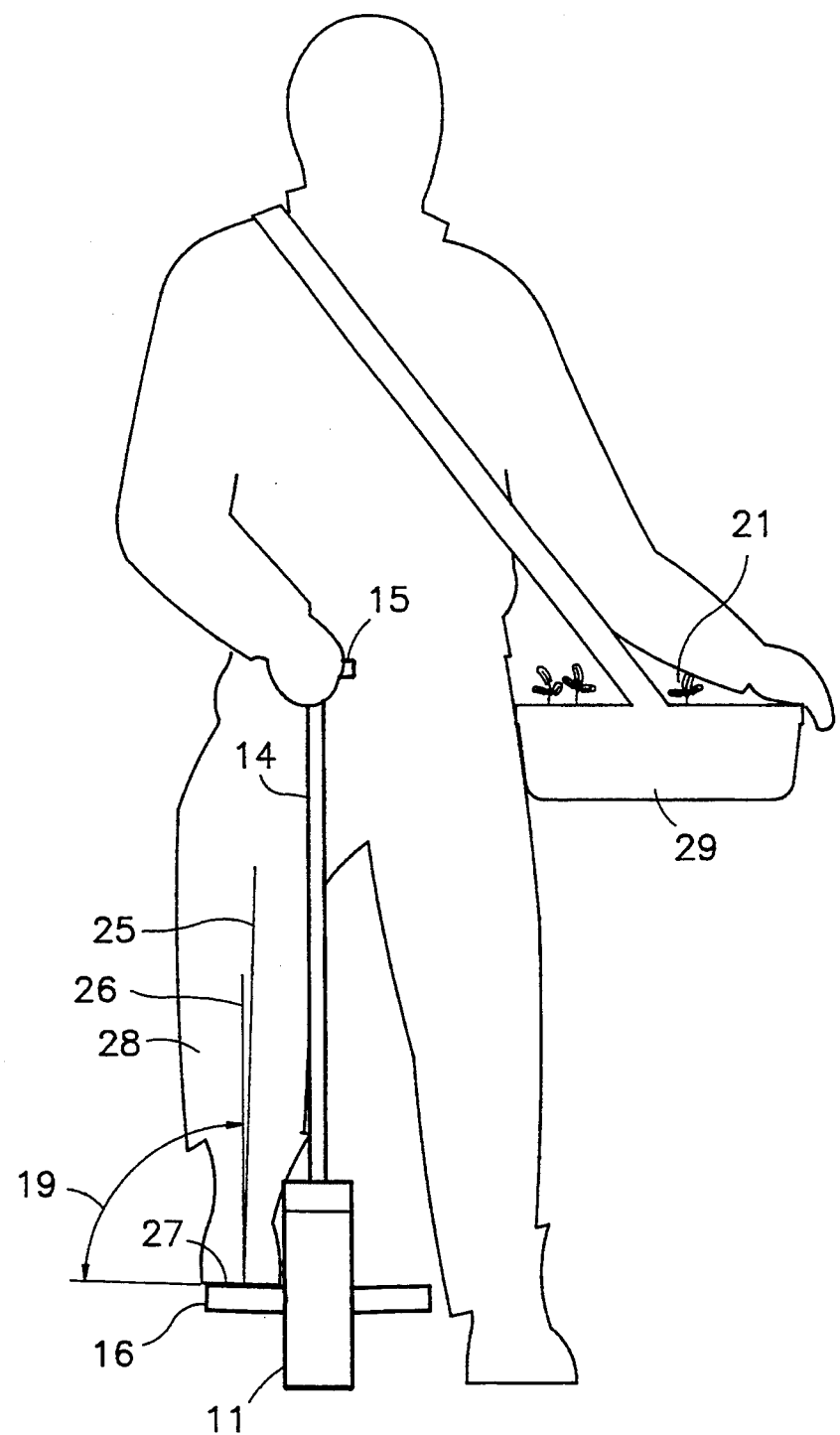
FIG. 8 illustrates a suggested method for pushing the tool into the ground, for extracting seedlings.

FIG. 8, the angle 19 of the foot bar 16, in relation to a vertical line 26 parallel to the longitudinal axis of the stem 14 is less than 90°.

The arrangement prevents the foot 27 of the user from slipping sideways. The angle 19 tends to bring the foot 27 inwardly, close to the hollow tube 11, ensuring minimum torque on the hollow tube 11 and thus minimum thrust reaction on the handle 14, 15.

The angle 29 also serves the purpose of keeping the leg 28 of the user aligned with an imaginary straight line 25 drawn perpendicular to the foot bar 16. The alignment of the leg 28 therefrom maintains the ankle and foot also within the same alignment. The resulting strain and unbalanced motions are therefore minimum.

The angles 19 of the foot bar 16 and the length of the stem 14 may vary with the models. The angle 19 is less pronounced, and the length of the stem 14 is longer for tall user's model. For example, an angle of 87° correspond to a total tool length 31 as illustrated on FIG. 2 of 36 inches.

The combination of these elements and the fabrication details explained, describe a transplanting tool which is easy to operate, efficient, inexpensive to fabricate, light in weight, and suitable for working in even grounds of a bedding area as well as for working in rough terrains.

This description of the invention shall not constitute a limitation in the scope of its applications, Also, it shall not constitute a limitation in the possible configuration of its elements.

The hollow tube 11 may have different diameter and different length to accommodate different species of plants. The hollow tube 11 may also have an enclosed shape other than circular. It can have a rectangular or polygonal shape without changing the efficiency of the tool.

The embodiments of the invention in which an exclusive property or privilege is claimed are defined as follows:

1. A manual implement for extracting and for planting seedlings comprising:
    a digging tube having an upper end and a lower end,
    a pair of foot bars, each said foot bar extending outwardly from said digging tube, at substantially opposite direction from one another,
    a handle means comprising a stem and a transverse piece, said stem having a first extremity attached to an outside surface of said digging tube, at a circumferential location thereon which is substantially perpendicular to said foot bars,
    said transverse piece being transversely mounted on a second extremity of said stem,
    the arrangement of the components therefrom offers a clear line of sight through said digging tube by a person standing in an upright position, and holding said implement at arm's length, whereby said digging tube is placed surely over a seedling without damaging the foliage thereof.

2. A manual implement as claimed in claim 1, wherein said transverse piece is transversely centered on said second extremity of said stem.

3. A manual implement as claimed in claim 2, wherein a length of said transverse piece is substantially the same as a width of a user's hand.

4. A manual implement as claimed in claim 1, wherein said stem and said transverse piece have a circular cross-section.

5. A manual implement as claimed in claim 1 further including a seedling ejecting means comprising;
    a hollow plunger having an upper portion and a lower portion,
    said hollow plunger being slidably contained within said digging tube,
    said lower portion being substantially equal in length to said digging tube,
    said upper portion having a boss means for preventing said hollow plunger from sliding out through said digging tube when said implement is held in a position where said lower end of said digging tube faces downwardly,
    whereby said hollow plunger remains afloat on a ground surface when said digging tube is pushed into a subsoil to enclose a seedling, and
    whereby a seedling extracted with said implement, and contained within said digging tube, is pushed out from said digging tube by depressing said hollow plunger towards said lower end of said digging tube.

6. A manual implement as claimed in claim 5, wherein said seedling ejecting means further comprises a chain means for preventing said hollow plunger from sliding out from said digging tube when said implement is held in a position where said lower end of said digging tube faces upwardly, such as when said manual implement is carried upon a shoulder of a user.

7. A manual implement as claimed in claim 5 wherein said digging tube and said hollow plunger each has a circular cross-section, and wherein said hollow plunger is concentric within said digging tube, such that a seedling contained within said digging tube is pushed out from said digging tube by depressing said hollow plunger, acting thereby upon a sod portion of said seedling adjacent an inside surface of said digging tube.

8. A manual implement as claimed in claim 1 wherein said lower end of said digging tube is sharpened to facilitate a penetration thereof into a soil surface.

9. A manual implement as claimed in claim 1 wherein the distance between said foot bar and said lower end of said digging tube provides a reference for repeatedly operating said implement at ideal depth.

10. A manual implement as claimed in claim 1, wherein each said foot bar forms an acute angle with an upper section of said digging tube, the arrangement of the foot bar therefrom prevents a foot of a user from sliding sideways, and an ankle of a user's foot from bending outwardly during a pressing of said digging tube into a soil surface, thereby providing foot comfort to said user operating said implement.

11. A manual implement as claimed in claim 10 wherein said acute angle is about 87°.

12. A manual implement as claimed in claim 10 wherein a total length thereof is about 36 inches and said acute angle is about 87°.

* * * * *